United States Patent
Wakatsuki et al.

(10) Patent No.: US 10,870,350 B2
(45) Date of Patent: Dec. 22, 2020

(54) VEHICLE DISPLAY DEVICE FOR OVERLAPPING DISPLAY IMAGE ON REAL LANDSCAPE

(71) Applicant: Yazaki Corporation, Tokyo (JP)

(72) Inventors: Tomotake Wakatsuki, Shizuoka (JP); Kazuyoshi Ogasawara, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 17 days.

(21) Appl. No.: 16/177,261

(22) Filed: Oct. 31, 2018

(65) Prior Publication Data
US 2019/0143816 A1 May 16, 2019

(30) Foreign Application Priority Data
Nov. 10, 2017 (JP) .................................. 2017-216975

(51) Int. Cl.
*B60K 35/00* (2006.01)
*G02B 27/01* (2006.01)

(52) U.S. Cl.
CPC .......... *B60K 35/00* (2013.01); *G02B 27/0101* (2013.01); *G02B 27/0179* (2013.01); *B60K 2370/334* (2019.05); *B60R 2300/205* (2013.01); *G02B 2027/014* (2013.01); *G02B 2027/0138* (2013.01); *G02B 2027/0141* (2013.01); *G02B 2027/0181* (2013.01)

(58) Field of Classification Search
None
See application file for complete search history.

(56) References Cited

U.S. PATENT DOCUMENTS

| | | | | |
|---|---|---|---|---|
| 2007/0137290 A1* | 6/2007 | Shiraishi | ................. | G06F 30/23 73/146 |
| 2008/0055192 A1* | 3/2008 | Nagano | ................. | G02B 27/01 345/7 |
| 2009/0005961 A1* | 1/2009 | Grabowski | ............ | G02B 27/01 701/532 |
| 2012/0224060 A1* | 9/2012 | Gurevich | ................. | B60R 1/00 348/148 |
| 2012/0249589 A1* | 10/2012 | Gassner | ................. | G02B 27/01 345/633 |
| 2015/0221220 A1* | 8/2015 | Arai | ........................ | G09G 5/36 340/907 |

(Continued)

FOREIGN PATENT DOCUMENTS

JP     2007278763 A   * 10/2007
JP     2016-90344 A     5/2016

*Primary Examiner* — Patrick F Valdez
(74) *Attorney, Agent, or Firm* — Kenealy Vaidya LLP (57) ABSTRACT

A vehicle display device acquires a plurality of point positions of a pair of white lines interposing a traffic lane extending forward of a vehicle from a frontward image. Interpolation formulas are created in a direction in which a plurality of point positions are continuous along the white lines, respectively. A base point is determined on any one of the interpolation formulas on the basis of distance information to an intersection forward of the vehicle. A road shape model is created such that a plurality of finite element models defined by the base point and a plurality of vertexes set on the interpolation formulas, respectively, directed from the base point to the vehicle side are arranged between a pair of interpolation formulas.

2 Claims, 11 Drawing Sheets

(56) References Cited

U.S. PATENT DOCUMENTS

2016/0284217 A1* 9/2016 Lee .................. B60K 35/00
2016/0327402 A1* 11/2016 Funabiki ............. B60W 40/02
2019/0018250 A1* 1/2019 Kasazumi ............. B60K 35/00

* cited by examiner

ROAD INCLINED DOWNWARD

FIG.15

VEHICLE DISPLAY DEVICE FOR OVERLAPPING DISPLAY IMAGE ON REAL LANDSCAPE

CROSS-REFERENCE TO RELATED APPLICATION(S)

The present application claims priority to and incorporates by reference the entire contents of Japanese Patent Application No. 2017-216975 filed in Japan on Nov. 10, 2017.

BACKGROUND OF THE INVENTION

1. Field of the Invention

The present invention relates to a vehicle display device.

2. Description of the Related Art

In recent years, there is known a vehicle mounted with a vehicle display device such as a head-up display (HUD). The vehicle display device allows a driver to visually recognize a virtual image by projecting a display image displayed on a display onto a windshield through an optical system such as a reflection mirror. For example, in the technique of Japanese Patent Application Laid-open No. 2016-90344, in order to allow a user to easily recognize an arrow pattern overlapped on an image of an intersection, a road width is acquired by reading white lines from a captured road image, and a length or thickness of an arrow pattern is changed depending on the road width. In addition, in the technique of JP 2016-90344 A, a shape of the arrow pattern itself is changed depending on a distance from the current position to a guide target intersection.

However, in the technique of JP 2016-90344 A, if the road is uneven and has an undulation, the arrow pattern overlapped on the image of the intersection is floated from the road, and the position indicated by the arrow pattern is deviated from the actual position of the intersection. Therefore, a driver may erroneously recognize a turning target road.

SUMMARY OF THE INVENTION

An object of the invention is to provide a vehicle display device capable of suppressing a driver from erroneously recognizing a turning target road.

A vehicle display device according to one aspect of the present invention projects a display image in front of a driver of a vehicle and overlappingly displays the display image on a real landscape forward of the vehicle, and the vehicle display device includes a viewpoint position detection unit that detects a viewpoint position of the driver; a three-dimensional coordinate acquiring unit that acquires a plurality of three-dimensional coordinates of a pair of colored lines interposing a traffic lane extending forward of the vehicle from a frontward image obtained by capturing the real landscape forward of the vehicle; a virtual line creating unit that creates each of virtual lines in a direction in which the plurality of three-dimensional coordinates are continuous along each of the colored lines; a base point determining unit that determines a base point on any one of the virtual lines on the basis of distance information to an indicator forward of the vehicle; a three-dimensional model creating unit that creates a three-dimensional model in which a plurality of finite element models defined by the base point and a plurality of vertexes set on each of the virtual lines directed to a vehicle side from the base point are arranged between the pair of virtual lines; and a display controller that performs texture mapping by attaching a source display image serving as a source of the display image to the three-dimensional model and displays, as the display image, an image obtained as the three-dimensional model is seen from a viewpoint position of the driver.

According to another aspect of the present invention, in the vehicle display device, it is preferable that the indicator represents an intersection, and the base point determining unit determines the base point on any one of the virtual lines positioned in a left or right side of the vehicle on the basis of left or right turn information of the vehicle at the intersection and distance information to the intersection in a navigation path to a destination.

According to still another aspect of the present invention, in the vehicle display device, it is preferable that the base point determining unit determines the base point on the virtual line in the left side of the vehicle on the basis of a distance to a center of the intersection in the case of a left turn of the vehicle, and the base point determining unit determines the base point on the virtual line in the right side of the vehicle on the basis of a distance to the intersection obtained by adding a width of a traffic lane extending in a right-turn direction from the intersection to the distance to the center of the intersection in the case of a right turn of the vehicle.

According to still another aspect of the present invention, in the vehicle display device, it is preferable that the base point determining unit determines the base point on the virtual line in the right side of the vehicle on the basis of a distance to a center of the intersection in the case of a right turn of the vehicle, and the base point determining unit determines the base point on the virtual line in the left side of the vehicle on the basis of a distance to the intersection obtained by adding a width of a traffic lane extending in a left-turn direction from the intersection to the distance to the center of the intersection in the case of a left turn of the vehicle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A vehicle display device according to an embodiment of the invention will now be described in details with reference to the accompanying drawings. Note that the following embodiment is not to be construed as a limitation to the invention. Elements described in the following embodiment include those that can be easily substituted by a person ordinarily skilled in the art and substantial equivalents thereof. Furthermore, for the elements described in the following embodiment, various omissions, substitutions, and alterations may be possible within the spirit and scope of the invention.

Embodiment

Figure 1:
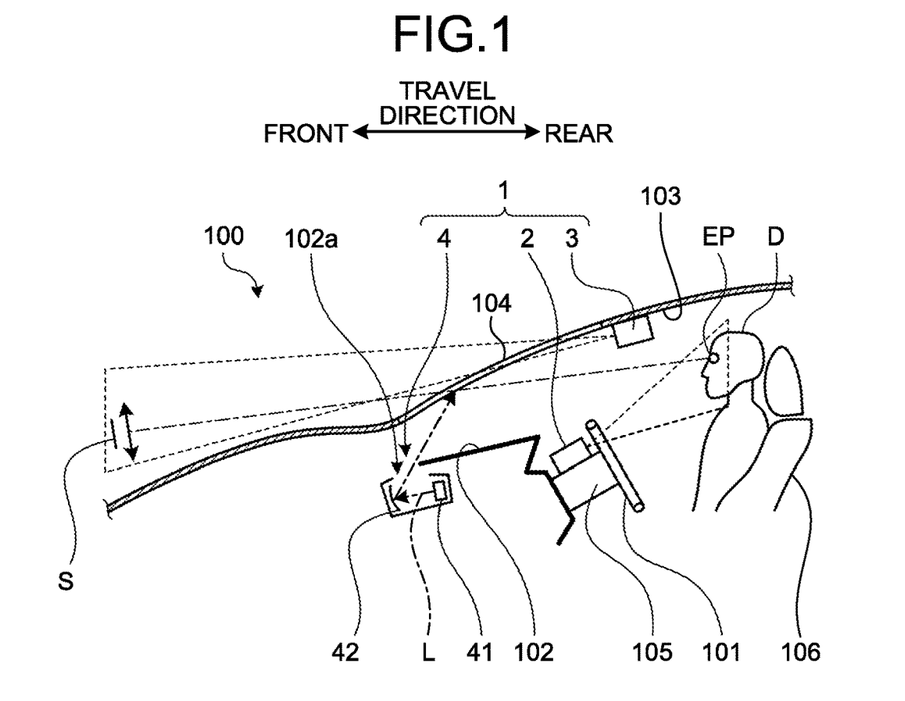
FIG. 1 is a schematic diagram illustrating a schematic configuration of a vehicle mounted with a vehicle display device according to an embodiment of the invention.

A vehicle display device 1 according to this embodiment illustrated in FIG. 1 is, for example, a head-up display (HUD) mounted on a vehicle 100 such as an automobile. In the vehicle display device 1, a display image is projected from a device main body 4 to a windshield 104 of a vehicle 100, and a virtual image S corresponding to the display image projected onto the windshield 104 is visually recognized from a viewpoint position (eyepoint: EP) of a driver D of the vehicle 100. The windshield 104 is a translucent property and reflects display light L incident from the device main body 4 toward an eyepoint EP of the driver D. The eyepoint EP is a viewpoint position of the driver D who seats on the driver's seat 106. The driver D can visually recognize the display image projected onto the windshield 104 as a virtual image S provided forward of a travel direction of the vehicle 100. The display image is displayed on a display 41 in the device main body 4, is reflected on an optical system 42, and is projected onto the windshield 104. The vehicle display device 1 according to this embodiment includes a driver camera 2, a vehicle front camera 3, a device main body 4, and a navigation device 5.

Figure 4:
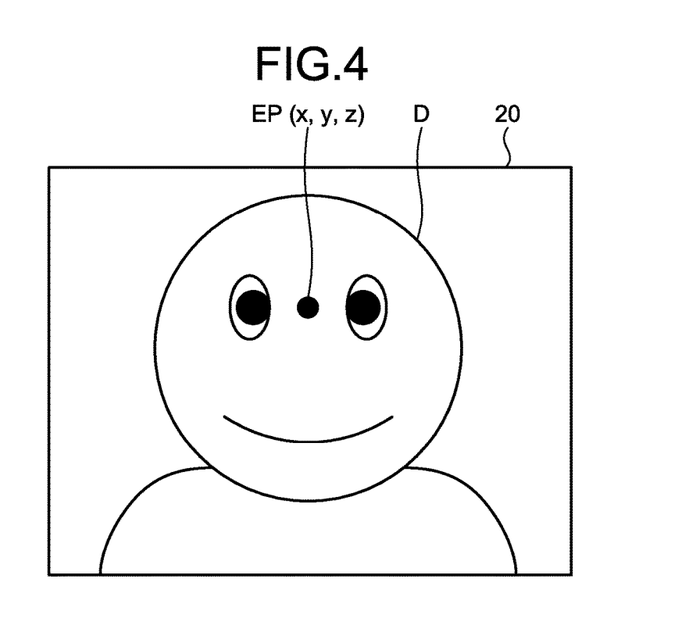
FIG. 4 is an explanatory diagram illustrating eyepoint detection in the vehicle display device according to an embodiment of the invention.

The driver camera 2 is arranged inside a cabin of the vehicle 100 to continuously capture a face of the driver D. The driver camera 2 serves as a viewpoint position detection unit. The driver camera 2 is, for example, a monocular camera, and is arranged over a steering column 105 in the cabin and in rear of a steering wheel 101 as seen from the driver D. The driver camera 2 is connected to the device main body 4 through a communication line 16 and sequentially outputs the captured images to the device main body 4 as a driver image 20. For example, the driver image 20 is a still image obtained by capturing the face of the driver D as illustrated in FIG. 4. Note that the driver image 20 may be a moving picture.

Figure 5:
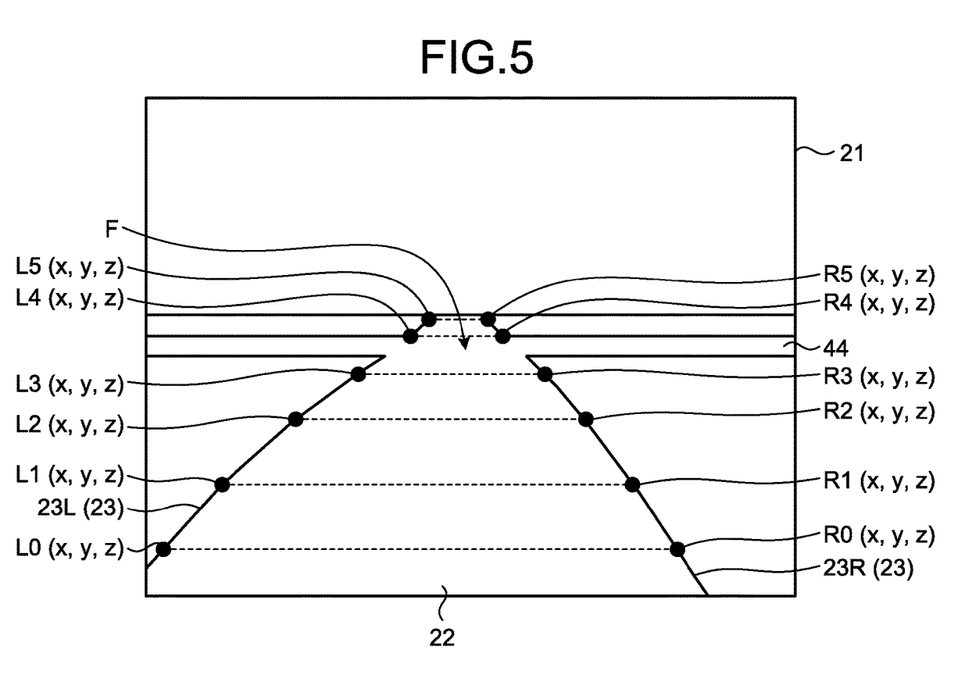
FIG. 5 is an explanatory diagram illustrating point position detection for white lines in the vehicle display device according to an embodiment of the invention.

The vehicle front camera 3 is arranged inside the cabin of the vehicle 100 to continuously capture a real landscape image forward of the vehicle through the windshield 104. The vehicle front camera 3 is, for example, a stereoscopic camera arranged in a roof 103 or a rearview mirror (not illustrated) inside the cabin. The vehicle front camera 3 is connected to the device main body 4 through a communication line 15 and sequentially outputs the captured image to the device main body 4 as a frontward image 21. The frontward image 21 is, for example, a still image obtained by capturing a real landscape forward of the vehicle as illustrated in FIG. 5. Note that the frontward image 21 may be a moving picture.

The device main body 4 projects the display image onto the windshield 104. The device main body 4 is arranged, for example, inside of an instrument panel 102 of the vehicle 100. An opening 102a is provided on an upper surface of the instrument panel 102. The device main body 4 projects the display image by irradiating the display light L toward the windshield 104 through the opening 102a.

The navigation device 5 is a so-called car navigation and provides a position of a host vehicle or detailed map information around the host vehicle, navigation path information to a destination, or the like to the driver D of the vehicle 100. The navigation device 5 acquires the position of the host vehicle on the basis of information from a global positioning system (GPS) satellite or the like. In addition, the navigation device 5 reads the navigation path information and the like from an internal memory (not illustrated) or externally obtains the information via communication. The navigation device 5 is connected to the controller 13 through a communication line 17 and outputs the navigation path information and the like to the controller 13 in response to a request.

Figure 2:
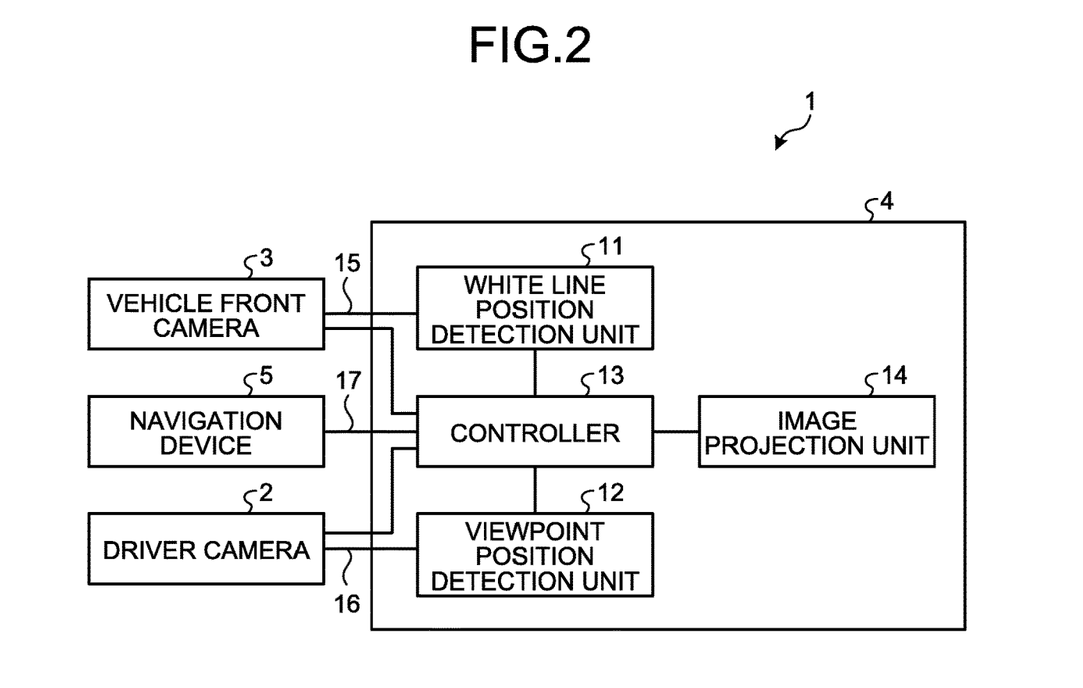
FIG. 2 is a block diagram illustrating a schematic configuration of the vehicle display device according to an embodiment of the invention.

The device main body 4 according to this embodiment includes a white line position detection unit 11, a viewpoint position detection unit 12, a controller 13, and an image projection unit 14 as illustrated in FIG. 2. The white line position detection unit 11, the viewpoint position detection unit 12, and the controller 13 are portions operating on a central processing unit (CPU), a memory, and a microcontroller having various interfaces or the like.

The white line position detection unit 11 is a three-dimensional coordinate acquiring unit configured to detect (extract) a plurality of point positions L0 to Ln and R0 to Rn (n: an integer, this similarly applies in the following description) from a pair of white lines 23L (23) and 23R (23) interposing a traffic lane 22 extending forward of the vehicle on the basis of the input frontward image 21. The traffic lane 22 is set to, for example, a left traffic direction in the case of a bidirectional traffic or a traffic direction in the case of a unidirectional traffic. For example, the traffic lane 22 intersects with a traffic lane 44 at an intersection F forward of the vehicle as illustrated in FIG. 5. The white lines of the frontward image 21 may be stopped at the intersection F, for example, as in the white lines 23, or may interpose the traffic lane 44 along a horizontal direction. In this regard, the white line position detection unit 11 detects all of the white lines from the frontward image 21, for example, through an image recognition processing, specifies a group of white lines extending straightly or nearly straightly (including a curve) forward of the vehicle along a travel direction of the vehicle 100, and then extracts a plurality of point positions L0 to Ln and R0 to Rn from the group of white lines. A plurality of point positions L0 to Ln and R0 to Rn are expressed as three-dimensional coordinates by setting the position of the vehicle front camera 3 as a coordinate origin. For example, the point positions are expressed as L0(x, y, z) to Ln(x, y, z) and R0(x, y, z) to Rn(x, y, z). The white line position detection unit 11 outputs a plurality of point positions L0(x, y, z) to Ln(x, y, z) and R0(x, y, z) to Rn(x, y, z) to the controller 13.

The viewpoint position detection unit 12 detects an eyepoint EP of a driver D on the basis of the input driver image 20. The viewpoint position detection unit 12 serves as a viewpoint position detection unit. The viewpoint position detection unit 12 detects an eyepoint EP of the driver D, for example, on the basis of a center position of a forehead of a face of the driver D in the driver image 20. The eyepoint EP is expressed as three-dimensional coordinates (eyepoint EP(x, y, z)) by setting the position of the driver camera 2 as a coordinate origin. The viewpoint position detection unit 12 outputs the eyepoint EP(x, y, z) to the controller 13.

The controller 13 is communicably connected to the driver camera 2, the vehicle front camera 3, the navigation device 5, the white line position detection unit 11, the viewpoint position detection unit 12, and the image projection unit 14 to control them. The controller 13 according to this embodiment functions as a virtual line creating unit, a base point determining unit, a three-dimensional model creating unit, and a display controller.

Figure 7:
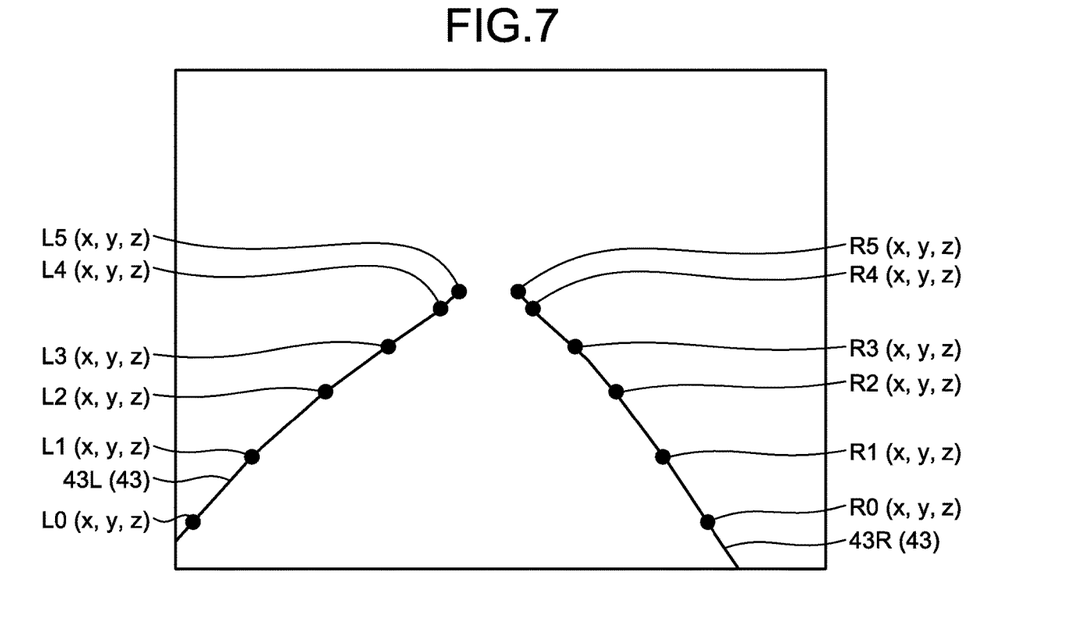
FIG. 7 is an explanatory diagram illustrating white line interpolation formulas in the vehicle display device according to an embodiment of the invention.

The controller 13 has a function of creating each virtual line in a direction in which a plurality of three-dimensional coordinates are continuous along the white lines 23L and 23R as the virtual line creating unit. The controller 13 receives a plurality of point positions L0(x, y, z) to Ln(x, y, z) and R0(x, y, z) to Rn(x, y, z) of the white lines 23L and 23R. As illustrated in FIG. 7, the controller 13 creates an interpolation formula 43L (43) as the virtual line in a direction in which a plurality of point positions L0(x, y, z) to Ln(x, y, z) are continuous along the white line 23L. In addition, the controller 13 creates an interpolation formula 43R (43) in a direction in which a plurality of point positions R0(x, y, z) to Rn(x, y, z) are continuous along the white line 23R. The interpolation formulas 43 according to this embodiment include, for example, linear interpolation, Lagrange interpolation, sprite interpolation, and the like. However, the invention is not limited thereto.

Figure 6:
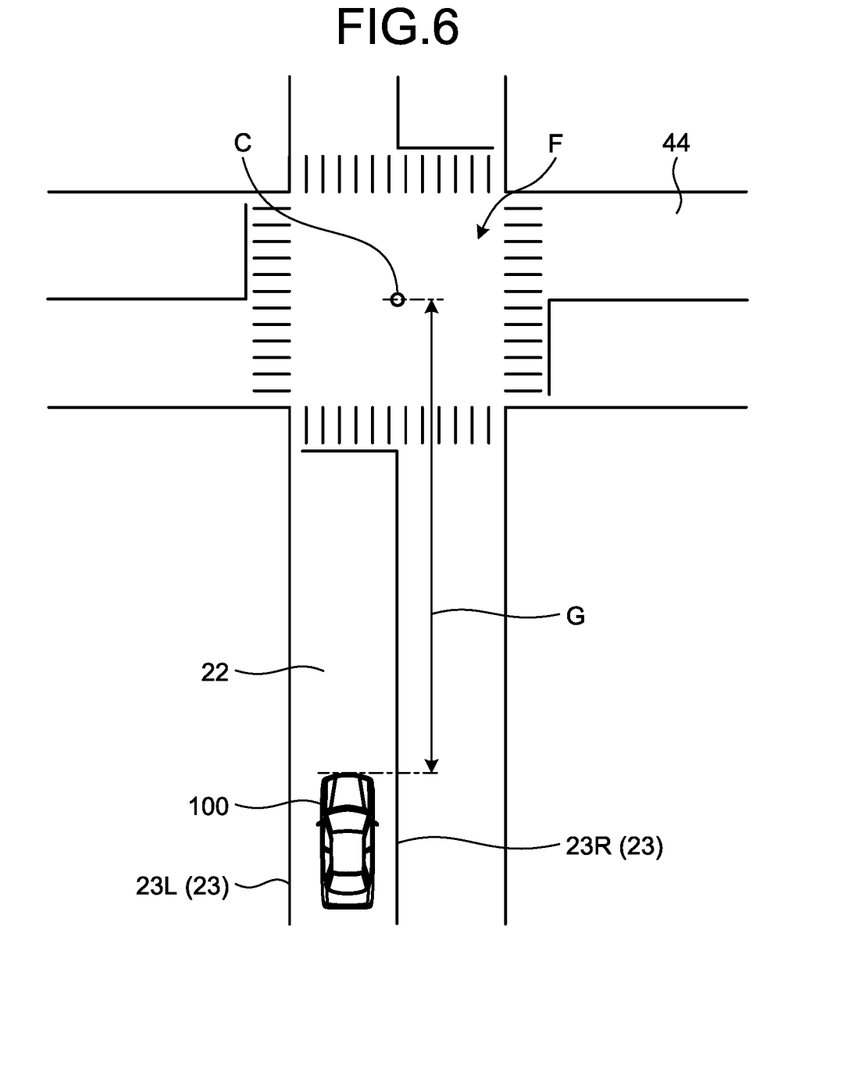
FIG. 6 is an explanatory diagram illustrating navigation path information in the vehicle display device according to an embodiment of the invention.
Figure 8:
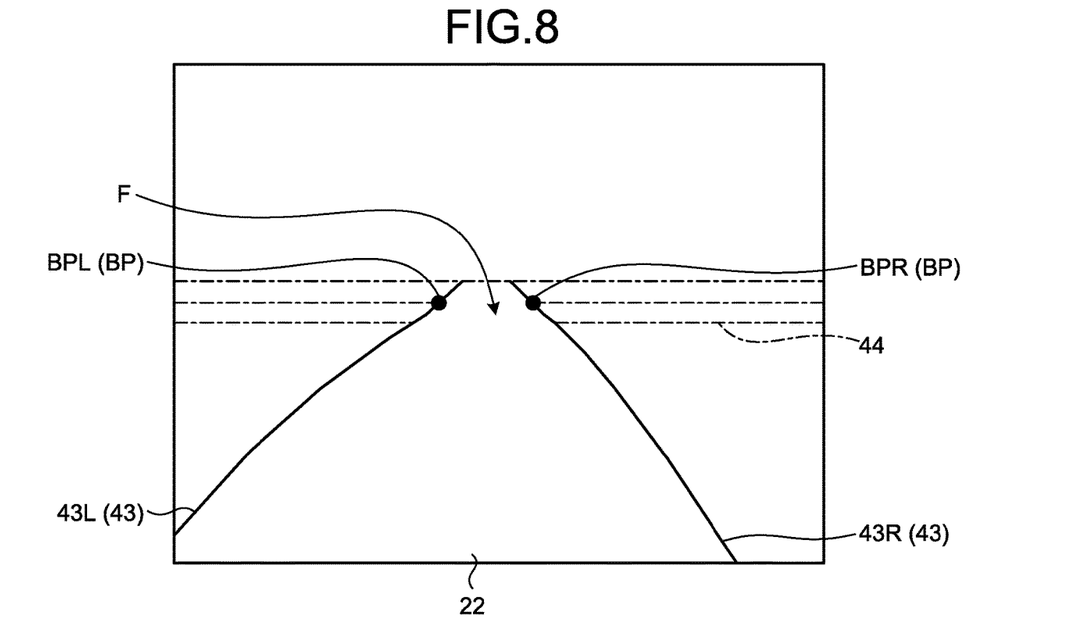
FIG. 8 is an explanatory diagram illustrating a base point position in the vehicle display device according to an embodiment of the invention.
Figure 9:
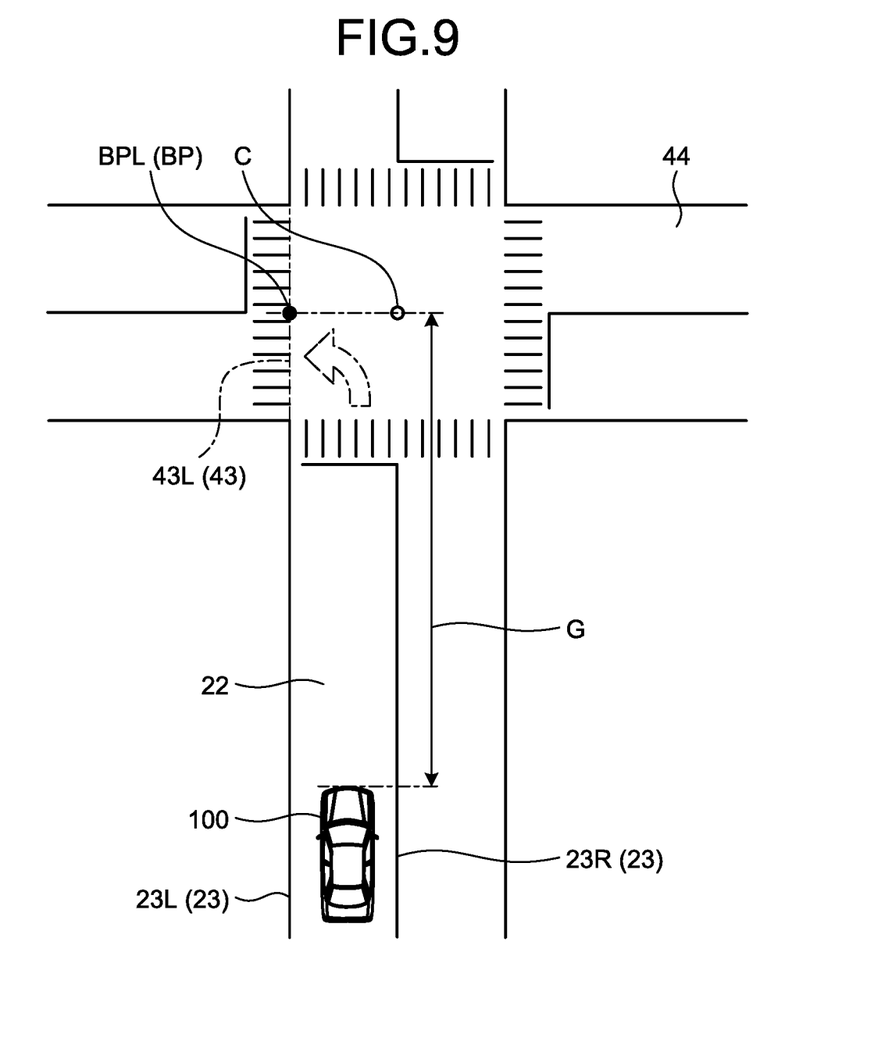
FIG. 9 is an explanatory diagram illustrating a base point position in the event of a left turn in the vehicle display device according to an embodiment of the invention.
Figure 10:
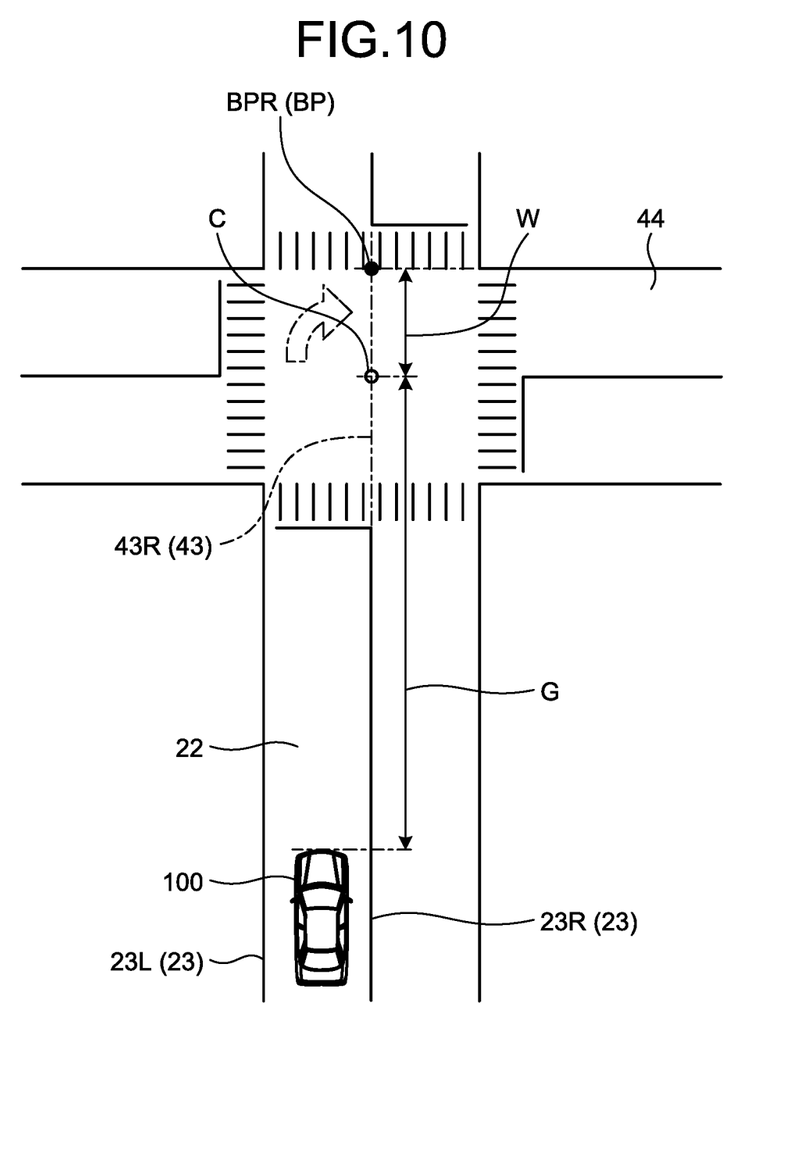
FIG. 10 is an explanatory diagram illustrating a base point position in the event of a right turn in the vehicle display device according to an embodiment of the invention.
Figure 12:
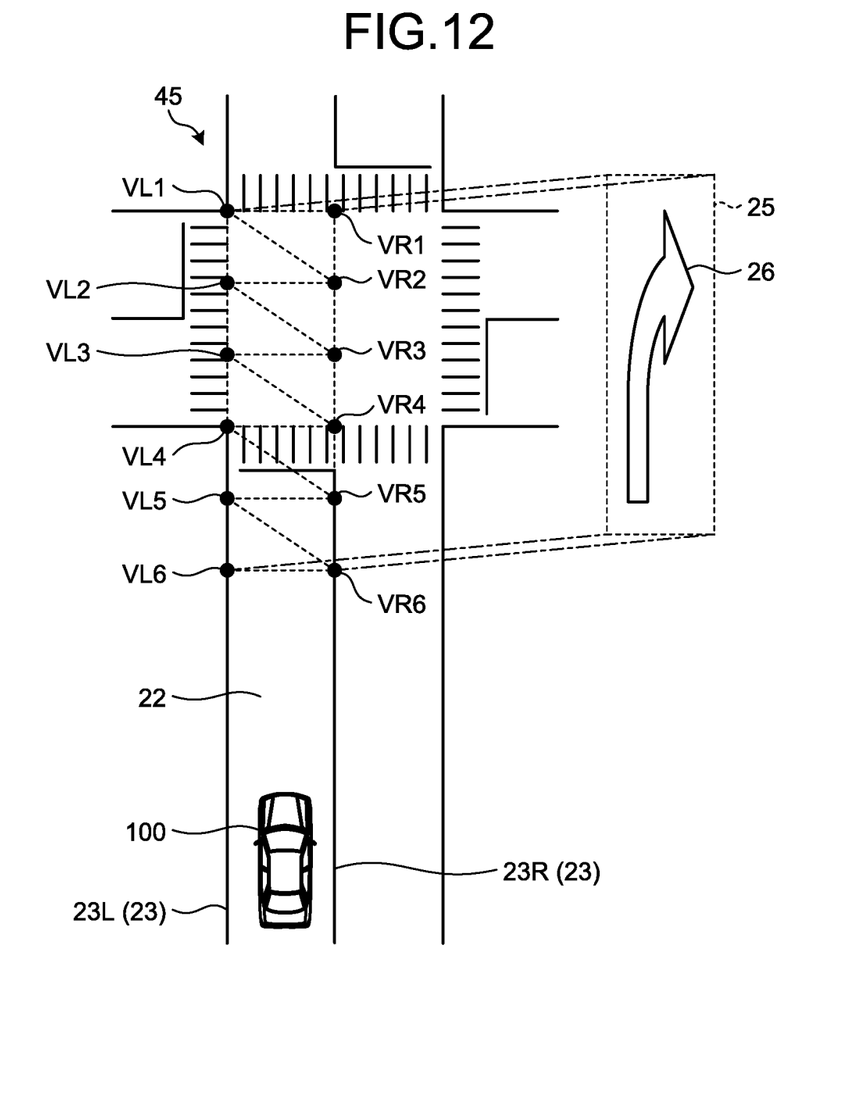
FIG. 12 is an explanatory diagram illustrating a road shape model in the vehicle display device according to an embodiment of the invention.

The controller 13 functions as a base point determining unit for determining a base point BP in any one of the interpolation formulas 43L and 43R on the basis of distance information to an indicator forward of the vehicle as illustrated in FIG. 8. Here, the indicator is an intersection F on a navigation path to a destination. In a broad sense, the intersection F is a place where two or more roads (driveways when a pavement and a driveway are sectioned) intersect, such as a crossroad or a T-junction. The intersection F is a place where the traffic lanes 22 and 44 intersect, and a vehicle turns to the left or the right immediately forward of the vehicle. The distance information to the indicator forward of the vehicle represents, for example, a distance G from a front end of the vehicle 100 to a center C of the intersection F as illustrated in FIG. 6. The base point BP serves as a reference point of a road shape model 45 described below and is expressed as three-dimensional coordinates (base point BP(x, y, z)). The base point BP is determined for the interpolation formulas 43 different between a right turn and a left turn of the vehicle 100. That is, the base point BP is determined for the interpolation formula 43R in the event of the right turn, and the base point BP is determined for the interpolation formula 43L in the event of the left turn. The controller 13 determines the base point BP on any one of the right interpolation formula 43R or the left interpolation formula 43L of the vehicle 100 on the basis of left or right turn information of the vehicle 100 at the intersection F in the middle of a navigation path to a destination and the distance information to the center C of the intersection F. The left or right turn information of the vehicle 100 at the intersection F is contained in the navigation path information input from the navigation device 5 and has, for example, a source display image 25 having a navigation pattern 26 as illustrated in FIG. 12. The source display image 25 is information for an overlappingly display and serves as a source of the display image displayed on the display 41. The distance information to the center C of the intersection F is contained in navigation path information input from the navigation device 5. In the event of the left turn of the vehicle 100, the controller 13 determines the base point BPL (BP) for the left interpolation formula 43L of the vehicle 100 on the basis of the distance G to the center C of the intersection F as illustrated in FIG. 9. Meanwhile, in the event of the right turn of the vehicle 100, the controller 13 determines the base point BPR (BP) for the right interpolation formula 43R of the vehicle 100 on the basis of the distance (G+W) to the intersection F obtained by adding the width W of the traffic lane 44 extending in the right turning direction from the intersection F to the distance G to the center C of the intersection F as illustrated in FIG. 10. In the case of a unidirectional traffic lane 44, both the base points BPL and BPR are determined as the distance G to the center C of the intersection F. In the case of a bidirectional traffic lane 44, the base points BPL and BPR are determined as the distance G and the distance G+W different from each other. Here, the width W of the traffic lane 44 is, for example, a minimum value of the traffic lane width. For example, the width W of the traffic lane 44 is set to 2.75 m in accordance with the local road structure rule. For example, the width W of the traffic lane 44 is obtained from the navigation device 5. However, the invention is not limited thereto.

Figure 11:
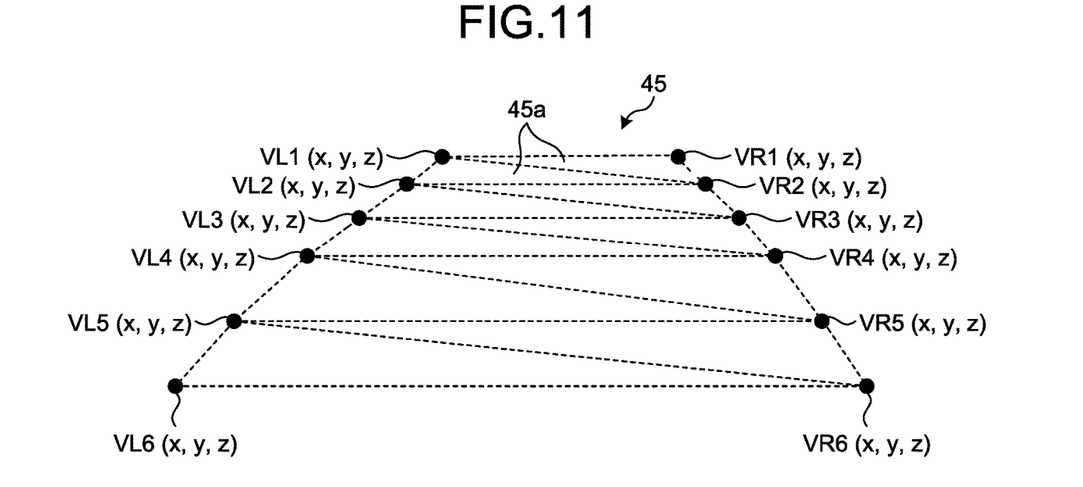
FIG. 11 is an explanatory diagram illustrating a road shape model in the vehicle display device according to an embodiment of the invention.

The controller 13 functions as a three-dimensional model creating unit to create a road shape model 45 in which a plurality of finite element models 45a are arranged between a pair of interpolation formulas 43L and 43R as illustrated in FIG. 11. The finite element model 45a is defined by the base point BP and a plurality of vertexes VL1(x, y, z) to VLn(x, y, z) and VR1(x, y, z) to VLn(x, y, z) set for the interpolation formulas 43L and 43R, respectively, directed from the base point BP to the vehicle 100. The finite element model 45a has, for example, a flat polygonal shape. The road shape model 45 is a three-dimensional (3D) model formed in a virtual space with respect to the base point BP. In the road shape model 45 according to this embodiment, the vertex VL1(x, y, z) set for the interpolation formula 43L is set as the base point BPL. Meanwhile, the vertex VR1(x, y, z) set for the interpolation formula 43R is set as the base point BPR.

Figure 13:
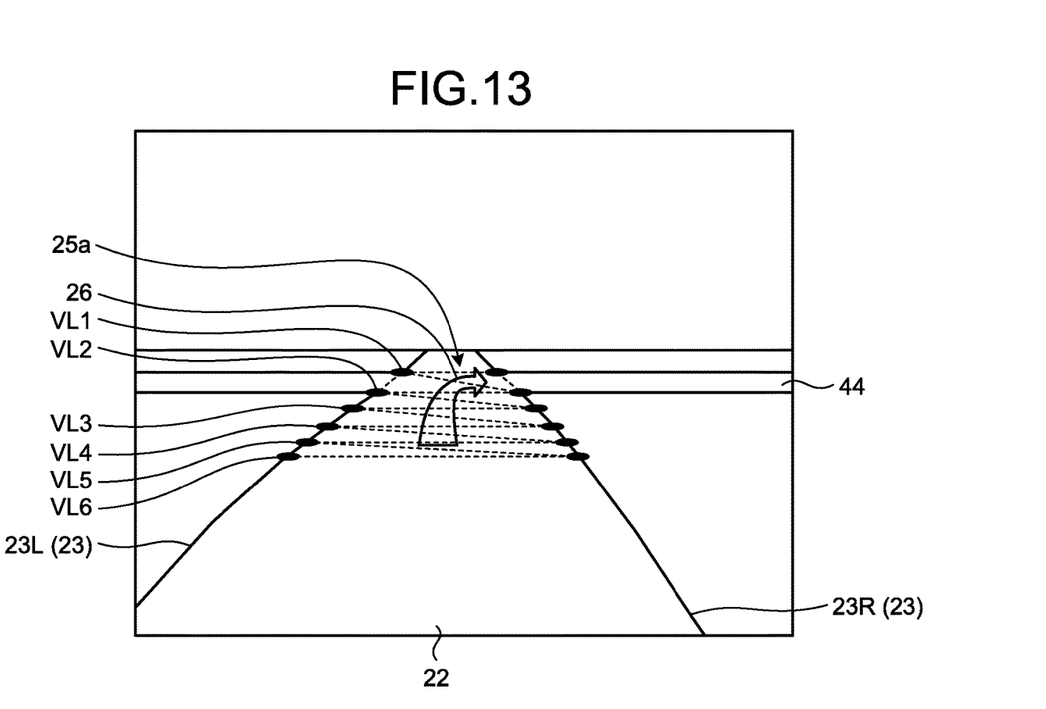
FIG. 13 is a diagram illustrating an exemplary display image in the vehicle display device according to an embodiment of the invention.

As illustrated in FIGS. 12 and 13, the controller 13 functions as a display controller to perform texture mapping by attaching the source display image 25 to the road shape model 45 and project an image (planar image) obtained as the road shape model 45 is seen from the eyepoint EP of the driver D from the image projection unit 14 as the display image 25a. The controller 13 creates the display image 25a which is a planar image by performing perspective projection transformation for the road shape model 45 subjected to the texture mapping. In addition, the controller 13 oppositely distorts the display image 25a displayed on the display 41 to cancel a distortion of the virtual image S caused by the windshield 104 and the optical system 42. The controller 13 outputs the display image 25a to the image projection unit 14.

The image projection unit 14 projects the display image 25a onto the windshield 104. The image projection unit 14 has a display 41 and an optical system 42. The display 41 has a liquid crystal display unit and a backlight unit (not illustrated). The liquid crystal display unit includes, for example, a thin-film transistor liquid crystal display (TFT-LCD). The backlight unit projects an image displayed on the liquid crystal display unit to the optical system 42 by irradiating light from the back side of the liquid crystal display unit. The optical system 42 reflects the image projected from the display 41 toward the windshield 104. The image reflected by the optical system 42 is projected toward the driver D by the windshield 104.

Figure 3:
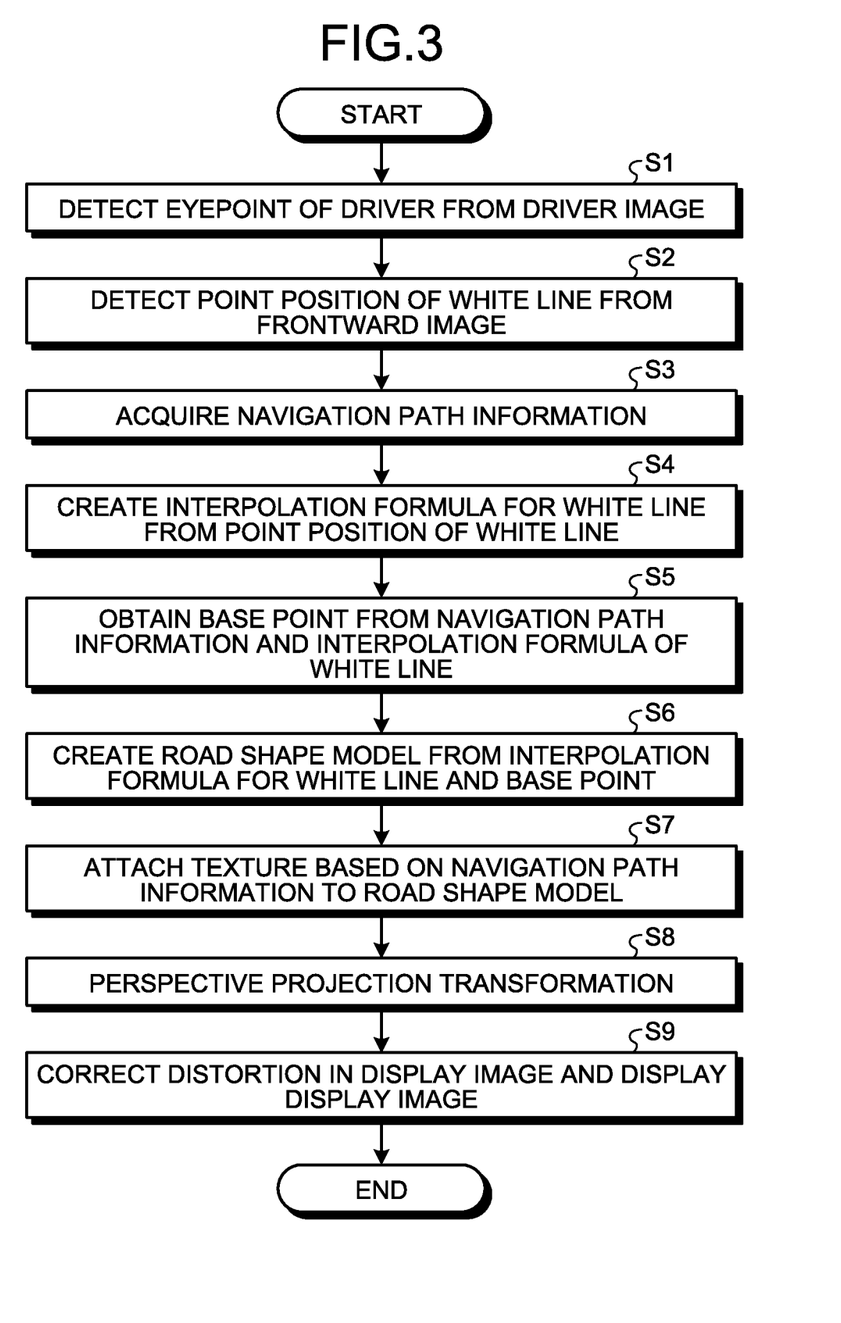
FIG. 3 is a flowchart illustrating an exemplary operation of the vehicle display device according to an embodiment of the invention.

Next, operations of the vehicle display device 1 according to this embodiment will be described with reference to FIG. 3. This processing is executed by starting the vehicle 100 (for example, by turning on an ignition switch) and is terminated as the vehicle 100 stops (for example, by turning off the ignition switch). However, the invention is not limited thereto. The sequence of the steps of the drawings is not limited to the sequence illustrated in the drawing.

First, in Step S1, the viewpoint position detection unit 12 detects an eyepoint EP(x, y, z) of the driver D from the driver image 20. The viewpoint position detection unit 12 outputs the detected eyepoint EP(x, y, z) of the driver D to the controller 13.

Next, in Step S2, the white line position detection unit 11 detects a plurality of point positions L0(x, y, z) to Ln(x, y, z) and R0(x, y, z) to Rn(x, y, z) of the white lines 23L and 23R from the frontward image 21. For example, the white line position detection unit 11 specifies the white lines 23L and 23R in the frontward image 21 and samples a plurality of points on each white line 23L and 23R as point positions L0 to L5 and R0 to R5. The white line position detection unit 11 obtains distances to each point position L0 to L5 and R0 to R5 from the vehicle 100 to detect three-dimensional coordinates of each point position L0 to L5 and R0 to R5. The white line position detection unit 11 outputs the detected point positions L0(x, y, z) to L5(x, y, z) and R0(x, y, z) to R5(x, y, z) to the controller 13.

Next, in Step S3, the controller 13 acquires the navigation path information from the navigation device 5. This navigation path information contains at least the left or right turn information of the intersection F and the distance information to the center C of the intersection F.

Next, in Step S4, the controller 13 creates the interpolation formulas 43L and 43R of the white lines 23L and 23R from a plurality of point positions L0(x, y, z) to Ln(x, y, z) and R0(x, y, z) to Rn(x, y, z) of the white lines 23L and 23R.

Next, in Step S5, the controller 13 obtains the base points BPL and BPR from the navigation path information and the interpolation formulas 43L and 43R of the white lines 23L and 23R.

Next, in Step S6, the controller 13 creates the road shape model 45 from the interpolation formulas 43L and 43R of the white lines 23L and 23R and the base points BPL and BPR. The controller 13 defines the base points BP and the finite element models 45a using a plurality of vertexes VL1(x, y, z) to VL6(x, y, z) and VR1(x, y, z) to VL6(x, y, z) set for each of the interpolation formulas 43L and 43R directed to the vehicle 100 from the base points BP. The controller 13 creates the road shape model 45 by arranging a plurality of finite element models 45a between a pair of interpolation formulas 43L and 43R. Note that, if the interpolation formulas 43L and 43R represent a curve, the values are approximated to the curve by increasing the number of the vertexes VL and VR.

Next, in Step S7, the controller 13 attaches texture based on the navigation path information to the road shape model 45. The controller 13 performs texture mapping by attaching the source display image 25 to the road shape model 45.

Next, in Step S8, the controller 13 performs perspective projection transformation for the road shape model 45 subjected to the texture mapping. As illustrated in FIG. 13, the controller 13 sets an image obtained as the road shape model 45 is seen from the eyepoint EP of the driver D as the display image 25a.

In Step S9, the controller 13 corrects a distortion in the display image 25a projected onto the windshield 104 and displays the display image 25a by overlapping on a real landscape using the image projection unit 14.

Figure 14:
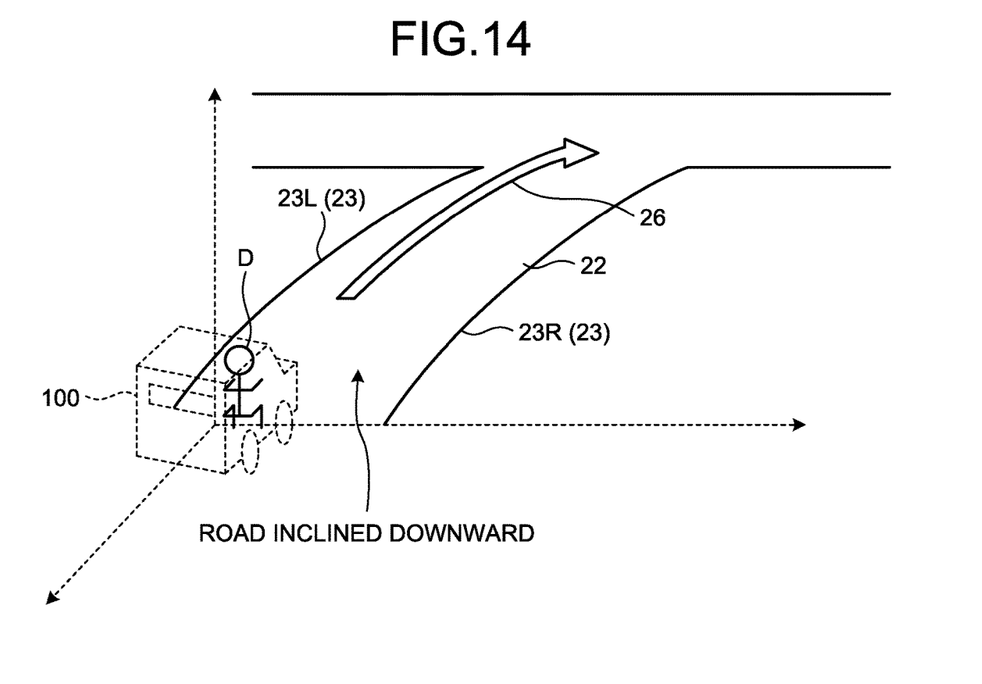
FIG. 14 is a diagram illustrating an exemplary display image in the vehicle display device according to an embodiment of the invention.

In this manner, the vehicle display device 1 according to this embodiment determines the base points BP on the basis of a pair of white lines 23L and 23R extending forward of the vehicle and the distance G to the intersection F, creates the road shape model 45 with respect to the base points BP, and creates the display image 25a by performing perspective projection transformation for the road shape model 45 obtained by performing texture mapping for the source display image 25. As a result, for example, as illustrated in FIG. 14, it is possible to combine a direction indicated by the display image 25a and a right-turn or left-turn direction at the intersection F in the real landscape even when there is a declining slope on the road forward of the vehicle. Therefore, it is possible to suppress the driver D from erroneously recognizing a turning target road. In addition, the vehicle display device 1 acquires a pair of point positions L0(x, y, z) to Ln(x, y, z) and R0(x, y, z) to Rn(x, y, z) of the white lines 23L and 23R interposing the traffic lane 22 extending forward of the vehicle from the frontward image 21. As a result, it is possible to easily recognize a road shape forward of the vehicle. In addition, the vehicle display device 1 creates the interpolation formulas 43L and 43R in a direction in which a plurality of point positions L0(x, y, z) to Ln(x, y, z) and R0(x, y, z) to Rn(x, y, z) are continuous along the white lines 23L and 23R, respectively. As a result, it is possible to easily determine the base point BP, for example, even at the intersection F where the white lines 23L and 23R stop. In addition, the vehicle display device 1 determines the base point BP for any one of the interpolation formulas 43 on the basis of the distance information to the intersection F forward of the vehicle. Therefore, it is possible to determine the base point BP serving as a reference of the road shape model 45 with high accuracy depending on the intersection F. In addition, the vehicle display device 1 creates the road shape model 45 in which a plurality of finite element models 45a defined by the base points BP and a plurality of set vertexes VL1(x, y, z) to VLn(x, y, z) and VR1(x, y, z) to VLn(x, y, z) are arranged between a pair of interpolation formulas 43L and 43R. As a result, it is not necessary to create a new three-dimensional model for each piece of information to be overlappingly displayed and commonalize the image overlapping process. As a result, it is possible to suppress an increase of the development cost and lower the device cost. In addition, the vehicle display device 1 performs texture mapping by attaching the source display image 25 to the road shape model 45 and displays an image obtained as the road shape model 45 is seen from the eyepoint EP of the driver D as the display image 25a. As a result, the display operation is finished just by attaching the overlappingly displayed information to the road shape model 45. Therefore, for example, it is possible to easily change the display image 25a.

The vehicle display device 1 according to this embodiment determines the base point BP on any one of the left and right interpolation formulas 43R and 43L of the vehicle 100 on the basis of the left or right turn information of the vehicle 100 at the intersection F and the distance information to the intersection F in the middle of the navigation path to the destination. As a result, even when there is an undulation on the road forward of the vehicle, it is possible to create the road shape model 45 with high accuracy in combination with the real landscape.

In the vehicle display device 1 according to this embodiment, in the case of the left turn of the vehicle 100, the base point BPL for the left interpolation formula 43L of the vehicle 100 is determined on the basis of the distance G to the center C of the intersection F. In addition, in the case of the right turn, the base point BPR for the right interpolation formula 43R of the vehicle 100 is determined on the basis of the distance to the intersection F obtained by adding the width W of the traffic lane 44 extending from the intersection F in the right-turn direction to the distance G to the center C of the intersection F. As a result, even when the traffic lane 44 extending from the intersection F in the right-turn direction is set as a bidirectional traffic, it is possible to create the road shape model 45 with high accuracy in combination with the real landscape.

Note that, although it is assumed that a traffic environment of the vehicle 100 is set as a left traffic in the aforementioned embodiment, the invention is not limited thereto. In the case of the right traffic and the right turn of the vehicle 100, the controller 13 determines the base point BPR for the right interpolation formula 43R of the vehicle 100 on the basis of the distance G to the center C of the intersection F. Meanwhile, in the case of the left turn of the vehicle 100, the base point BPL for the left interpolation formula 43L of the vehicle 100 is determined on the basis of the distance to the intersection F obtained by adding the width W of the traffic lane 44 extending from the intersection F in the left-turn direction to the distance G to the center C of the intersection F. In this configuration, it is possible to achieve the same effects as those of the vehicle display device 1 described above even when the traffic environment of the vehicle 100 is set as the right traffic.

Figure 15:
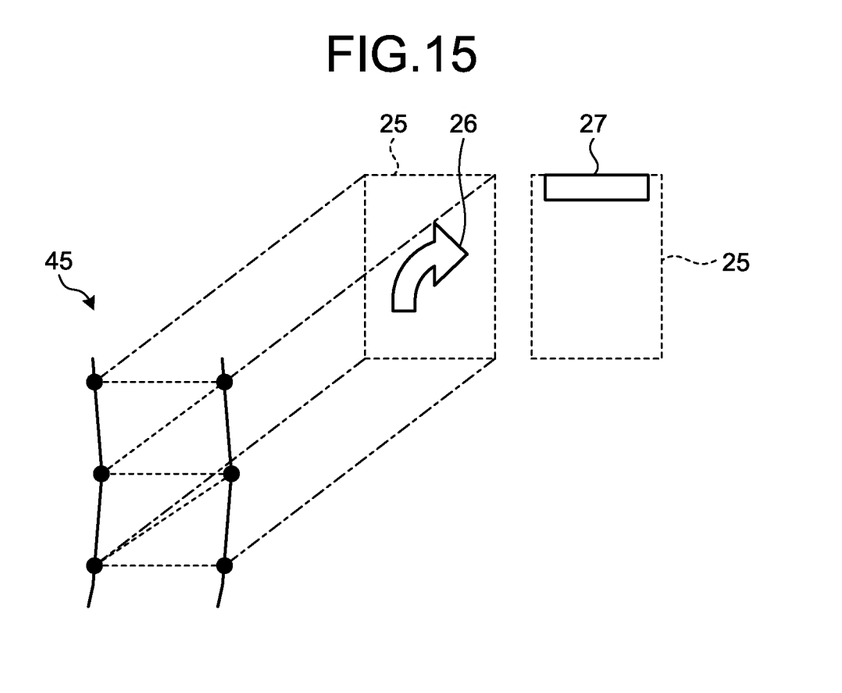
FIG. 15 is an explanatory diagram illustrating a road shape model in the vehicle display device according to a modification of the embodiment.

Although the source display image 25 having the navigation pattern 26 is attached to the road shape model 45 as texture in the aforementioned embodiment, the invention is not limited thereto. For example, the source display image 25 may have a stoppable distance 27 as illustrated in FIG. 15. The stoppable distance 27 is a distance for stopping the vehicle 100 and is expressed as a bar-shaped pattern extending in the horizontal direction. In this case, it is possible to display the stoppable distance 27 with high accuracy by determining the position of the base point BP depending on a travel speed of the vehicle 100 and creating the road shape model 45 even when there is an undulation on the road forward of the vehicle.

Although the distance information to the indicator forward of the vehicle is set to the distance G from the front end of the vehicle 100 to the center C of the intersection F in the aforementioned embodiment, the invention is not limited thereto. The distance information may be set differently as long as the distance to the indicator can be obtained without an error. For example, the distance information may be a distance from the vehicle front camera 3 to the indicator.

Although the vehicle front camera 3 is a binocular camera such as a so-called stereoscopic camera in the aforementioned embodiment, the invention is not limited thereto. A monocular camera may also be employed. That is, a monocular camera may also be employed as long as a plurality of point positions L0(x, y, z) to Ln(x, y, z) and R0(x, y, z) to Rn(x, y, z) of the white lines 23L and 23R can be detected.

Although the controller 13 displays the display image 25a by overlapping it on the real landscape using the image projection unit 14 in the aforementioned embodiment, the display image 25a is preferably arranged in a position not overlapping with a road presentation (not illustrated) on the traffic lane 22.

Although the white line position detection unit 11 detects the white line 23 extending from the frontward image 21 forward of the vehicle in the aforementioned embodiment, the invention is not limited thereto. A yellow line or a combination of the white and yellow lines may also be employed. The white and yellow lines may be displayed as a solid line, a dotted line, or a combination of the solid and dotted lines.

Although the driver camera 2 and the vehicle front camera 3 are connected to the device main body 4 in a wired manner in the aforementioned embodiment, they may be connected in a wireless manner. As a result, a wiring work is not necessary.

Although the controller 13 acquires the source display image 25 from the navigation device 5 in the aforementioned embodiment, the invention is not limited thereto. For example, the controller 13 may be configured such that the navigation path information or the like are externally acquired via radio communication.

Although it is assumed that the controller 13 creates the road shape model 45 by detecting the white lines in the aforementioned embodiment, the invention is not limited thereto. The controller 13 may create the road shape model 45 on the basis of the road shape data and the distance information to the intersection F, for example, by acquiring the road shape data from the navigation device 5. In this case, for example, the road shape model 45 can be implemented, for example, by acquiring a slope angle of the vehicle 100 using a tiltmeter and adjusting a viewpoint angle of the eyepoint EP on the basis of the slope angle during the perspective projection transformation.

In the vehicle display device according to the present embodiments, it is possible to suppress a driver from erroneously recognizing the turning target road.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device that projects a display image in front of a driver of a vehicle and overlappingly displays the display image on a real landscape forward of the vehicle, the vehicle display device comprising:
- a driver camera configured to capture a driver image of the driver;
- a vehicle front camera configured to capture a frontward image of the real landscape forward of the vehicle; and
- a processor-based controller in communication with each of the display, the driver camera, and the vehicle front camera, and configured to,
    - detect a viewpoint position of the driver based on the driver image;
    - acquire a plurality of three-dimensional coordinates of a pair of colored lines interposing a traffic lane extending forward of the vehicle from the frontward image;
    - create each of virtual lines in a direction in which the plurality of three-dimensional coordinates are continuous along each of the colored lines;
    - determine a base point on any one of the virtual lines on the basis of distance information to an indicator forward of the vehicle;
    - create a three-dimensional model in which a plurality of finite element models defined by the base point and a plurality of vertexes set on each of the virtual lines directed to a vehicle side from the base point are arranged between the pair of virtual lines; and
    - perform texture mapping by attaching a source display image serving as a source of the display image to the three-dimensional model and display, as the display image, an image obtained as the three-dimensional model is seen from a viewpoint position of the driver, wherein the indicator represents an intersection, and the processor-based controller is configured to determine the base point on any one of the virtual lines positioned in a left or right side of the vehicle on the basis of left or right turn information of the vehicle at the intersection and distance information to the intersection in a navigation path to a destination, the processor-based controller is configured to determine the base point on the virtual line in the left side of the vehicle on the basis of a distance to a center of the intersection in the case of a left turn of the vehicle, and the processor-based controller is configured to determine the base point on the virtual line in the right side of the vehicle on the basis of a distance to the intersection obtained by adding a width of a traffic lane extending in a right-turn direction from the intersection to the distance to the center of the intersection in the case of a right turn of the vehicle, or the processor-based controller is configured to determine the base point on the virtual line in the right side of the vehicle on the basis of a distance to a center of the intersection in the case of a right turn of the vehicle, and the processor-based controller is configured to determine the base point on the virtual line in the left side of the vehicle on the basis of a distance to the intersection obtained by adding a width of a traffic lane extending in a left-turn direction from the intersection to the distance to the center of the intersection in the case of a left turn of the vehicle.

2. The vehicle display device according to claim 1, wherein
the processor-based controller is configured to oppositely distort the display image displayed to cancel a distortion caused by a windshield of the vehicle.

* * * * *